United States Patent
Morishima et al.

(10) Patent No.: US 6,855,444 B2
(45) Date of Patent: Feb. 15, 2005

(54) FUEL CELL SYSTEM

(75) Inventors: Shingo Morishima, Toyota (JP); Eitaro Tanaka, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/448,236

(22) Filed: May 30, 2003

(65) Prior Publication Data

US 2003/0232226 A1 Dec. 18, 2003

(30) Foreign Application Priority Data

Jun. 12, 2002 (JP) ........................................ 2002-171503

(51) Int. Cl.$^7$ .............................................. H01M 8/04
(52) U.S. Cl. .............................. 429/24; 429/25; 429/34
(58) Field of Search ................................ 429/24, 34, 25

(56) References Cited

U.S. PATENT DOCUMENTS

| | | | |
|---|---|---|---|
| 6,358,637 B1 | | 3/2002 | Fuss |
| 2003/0022037 A1 | * | 1/2003 | Parr et al. ..................... 429/22 |
| 2003/0031900 A1 | | 2/2003 | Tajima et al. |
| 2003/0072984 A1 | * | 4/2003 | Saloka et al. ................. 429/26 |
| 2003/0162063 A1 | * | 8/2003 | Yoshizawa et al. ........... 429/24 |

FOREIGN PATENT DOCUMENTS

| | | |
|---|---|---|
| JP | A 60-16263 | 1/1985 |
| JP | A 62-140375 | 6/1987 |
| JP | A 64-71079 | 3/1989 |
| JP | A 11-214025 | 8/1999 |
| JP | A 2001-185179 | 7/2001 |
| JP | A 2002-216824 | 8/2002 |

* cited by examiner

Primary Examiner—John S. Maples
(74) Attorney, Agent, or Firm—Oliff & Berridge, PLC (57) ABSTRACT

Provided is a fuel cell system capable of activating a fuel cell even under low-temperature environments. The fuel cell system detects an outside air temperature in the vicinity of the fuel cell to, after the fuel cell enters a deactivated state, estimate a transition of outside air temperature on the basis of a variation of the detected outside air temperature, and makes a decision as to whether or not the estimated outside air temperature falls below a predetermined freezing temperature at which moisture freezes. When a decision is made that the estimated outside air temperature falls below the predetermined freezing temperature, freezing prevention processing is conducted to prevent moisture from freezing in the interior of the fuel cell. The estimation of the outside air temperature transition is made by time-differentiating a variation of outside air temperature.

9 Claims, 5 Drawing Sheets

FUEL CELL SYSTEM

BACKGROUND OF THE INVENTION

1) Field of the Invention

The present invention relates to a fuel cell system comprising a fuel cell made to generate electric energy through chemical reactions between hydrogen and oxygen, and effectively applicable to movable bodies such as vehicles, ships and portable generators.

2) Description of the Related Art

So far, there has been known a fuel cell system equipped with a fuel cell which generates electricity through the use of electrochemical reactions between hydrogen and oxygen (air). For example, a polyelectrolyte type fuel cell, considered as a drive source for vehicles and others, requires keeping a high polymer electrolyte membrane in a damp or wet condition.

In a case in which a vehicle equipped with such a fuel cell is deactivated or stopped under low-temperature environments, there is a possibility of freezing of moisture existing within the fuel cell or a reaction gas path (passage). In addition, in the case of a fuel cell system in which an unreacted gas (off-gas) emitted from a fuel cell is recirculated to the fuel cell through the use of a pump, there is a possibility of freezing of moisture left in the pump or valves.

In a case in which a fuel cell is activated under such low-temperature environments, there arises a problem in that difficulty is encountered in activating the fuel cell due to the hindrance of advance/arrival of reaction gases (hydrogen and air) to or at an electrolyte membrane stemming from freezing, the clogging of a reaction gas path, a pump locked state, or others.

SUMMARY OF THE INVENTION

The present invention has been developed with a view to eliminating the above-mentioned problem, and it is therefore an object of the invention to provide a fuel cell system capable of activating a fuel cell even under low-temperature environments.

For this purpose, in accordance with a first aspect of the present invention, there is provided a fuel cell system including a fuel cell (1) which generates electric energy through chemical reaction between hydrogen and oxygen, comprising outside air temperature detecting means (25) for detecting an outside air temperature in the vicinity of the fuel cell, outside air temperature estimating means (S11) for, after the fuel cell (1) enters a deactivated state, estimating a transition of outside air temperature on the basis of a variation of outside air temperature detected by the outside air temperature detecting means (25), freezing decision means (S12) for making a decision as to whether or not the estimated outside air temperature obtained by the outside air temperature estimating means (S11) falls below a predetermined freezing temperature at which moisture freezes, and freezing prevention processing means (S14) for, when the freezing decision means (S12) makes a decision that the estimated outside air temperature falls below the predetermined freezing temperature, preventing moisture from freezing in the interior of the fuel cell (1).

In this way, a transition (or change) of the outside air temperature is estimated to conduct freezing prevention processing in the case of estimating freezing, which can prevent the next activation of the fuel cell from being difficult due to the moisture freezing. Moreover, since a transition of the outside air temperature is estimated and the freezing prevention processing is conducted only in a case in which the freezing has been estimated, the useless consumption of power for the freezing prevention processing is preventable.

In addition, according to a second aspect of the present invention, the outside air temperature estimating means (S11) time-differentiates the outside air temperature variation for calculating and estimating the outside air temperature transition.

Still additionally, according to a third aspect of the present invention, when a decision is made that the estimated outside air temperature falls below the predetermined freezing temperature, the outside air temperature estimation in the outside air temperature estimating means (S11) is terminated or deactivated, which can avoid the useless power consumption.

Yet additionally, according to a fourth aspect of the present invention, the fuel cell system further comprises an off-gas circulation path (15) for recirculating an off-gas including unreacted hydrogen, emitted from the fuel cell (1), to the fuel cell (1), and pump means (16) provided in the off-gas circulation path (15) for feeding a gas within the off-gas circulation path (15) under pressure, and the freezing prevention processing means (S14) prevents moisture from freezing in the interior of the off-gas circulation path (15) and in the interior of the pump means (16).

Moreover, according to a fifth aspect of the present invention, the fuel cell system further comprises a gas-liquid separator (17) provided in the off-gas circulation path (15) for separating and removing moisture contained in a gas passing through the off-gas circulation path (15), and the freezing prevention processing means (S14) activates the pump means (16) when a decision is made that the estimated outside air temperature falls below the predetermined freezing temperature.

This can remove the moisture in the gas circulating in the off-gas circulation path (15) and the fuel cell (1), that is, it can remove the moisture in the interiors of the fuel cell (1), the piping (15) and the pump (16).

Still moreover, according to a sixth aspect of the present invention, the fuel cell system further comprises a pressure sensor (24) for detecting a pressure of the off-gas so that the predetermined freezing temperature is corrected on the basis of the pressure of the off-gas detected by the pressure sensor (24). This contributes to accurate decision on the freezing temperature.

Yet moreover, according to a seventh aspect of the present invention, the fuel cell system further comprises moisture concentration detecting means (23) for detecting a moisture concentration of the off-gas so that the freezing prevention processing means (S17) is terminated or deactivated when the moisture concentration of the off-gas detected by the moisture concentration detecting means (23) becomes below a predetermined value. This contributes to avoiding the useless power consumption.

Furthermore, according to an eighth aspect of the present invention, the fuel cell system further comprises a decompression valve (27) provided in a hydrogen supply path (11) for supplying hydrogen to the fuel cell (1) and made to open and close the hydrogen supply path (11) and an emission path (19) provided on the downstream side of the pump means (16) in the off-gas circulation path (15) for emitting a gas discharged from the pump means (16), and the freezing prevention processing means (S14) makes the decompression valve (27) close the hydrogen supply path (11) and makes the pump means (16) discharge a gas within the off-gas circulation path (15) through an emission path (19).

This can achieve the decompression between the decompression valve (27) and the pump means (16) so that the moisture existing therebetween can be decompression-boiled to be discharged to the external.

Still furthermore, according to a ninth aspect of the present invention, the gas-liquid separator is of a centrifugal type which is rotationally driven by a drive shaft (28c) of the pump means (28). Such gas-liquid separation using the rotational motive power enables more effective gas-liquid separation. Yet furthermore, this construction permits the integration of the pump means and gas-liquid separator and eliminates the need for placing the gas-liquid separator independently, which enables the size reduction of the fuel cell system.

The reference numerals in parentheses attached to the respective means or members signify the corresponding relation with respect to the concrete means in an embodiment which will be described later.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

(First Embodiment)

A first embodiment of the present invention will be described hereinbelow with reference to FIGS. 1 to 4. A fuel cell system according to this first embodiment is suitably applicable to, for example, an electric vehicle (fuel cell powered vehicle) using a fuel cell as an electric power source.

Figure 1:
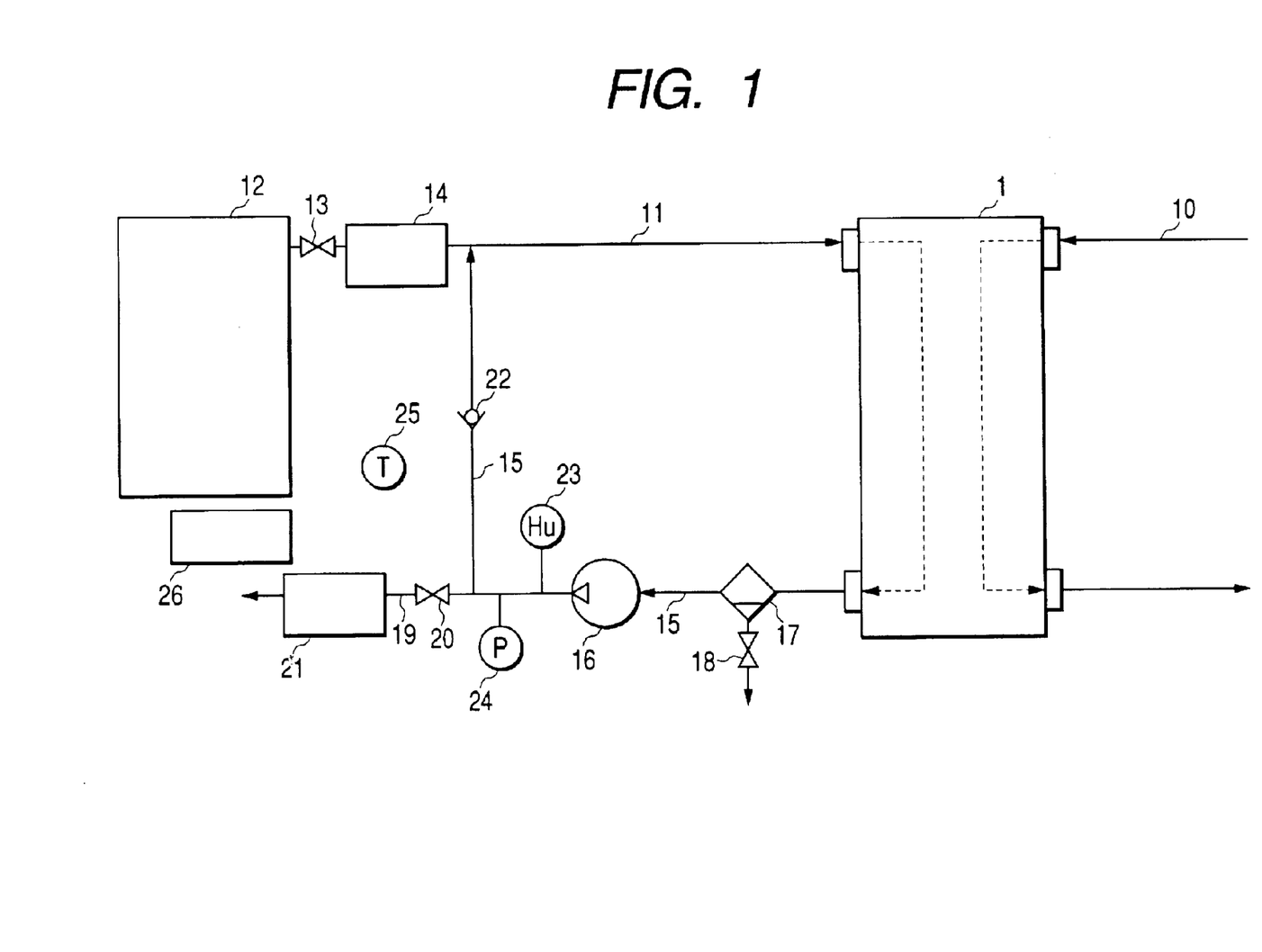
FIG. 1 is a conceptual illustration of the entire construction of a fuel cell system according to a first embodiment of the present invention.

FIG. 1 is an illustration of the entire construction of a fuel cell system according to the first embodiment. A fuel cell (FC stack) 1 is designed to generate electric power through the use of electrochemical reaction between hydrogen and oxygen. In the first embodiment, a solid polyelectrolyte type fuel cell is employed as the fuel cell 1, and a plurality of cells each constitutes basic unit are formed into a laminated condition. Each of the cells is such that an electrolyte membrane is sandwiched between a pair of electrodes. The fuel cell 1 is made to supply electric power to electric equipment such as a driving motor or secondary battery (not shown). In the fuel cell 1, upon receipt of the supply of hydrogen and air (oxygen), the following electrochemical reaction between hydrogen and oxygen takes place to generate electric energy.

(hydrogen electrode side) $H_2 \rightarrow 2H^+ + 2e^-$ (oxygen electrode side) $2H^+ + \frac{1}{2}O_2 + 2e^- \rightarrow H_2O$ This electrochemical reaction develops formation water, and as will be mentioned later, humidified hydrogen and air are supplied to the fuel cell 1 and condensate appears in the interior of the fuel cell 1. For this reason, in the interior of the fuel cell 1, moisture exits in a hydrogen path through which hydrogen passes and in an air path through which air passes.

A fuel cell system is equipped with an air supply path 10 for supplying air (oxygen) to the oxygen electrode (positive (electrode) side of the fuel cell 1, and a hydrogen supply path 11 for supplying hydrogen to the hydrogen electrode (negative electrode) side of the fuel cell 1. Air (oxygen) is supplied from an air supply device (not shown) to the air supply path 10 while hydrogen is supplied from a hydrogen supply device 12 to the hydrogen supply path 11. For example, as the hydrogen supply device 12, it is possible to employ a hydrogen tank filled with high-pressure hydrogen or a modification device made to produce hydrogen through modification reaction. This first embodiment employs a high-pressure hydrogen tank.

For the aforesaid electrochemical reaction, the electrolyte membrane in the interior of the fuel cell 1 is required to be placed into a damp or wet condition containing moisture. Therefore, a humidifier (not shown) is provided in the air supply path 10 and the hydrogen supply path 11 in order to humidify the air and hydrogen to be supplied to the fuel cell 1.

On the downstream side of the hydrogen supply path 11, there are provided a hydrogen supply valve 13 for starting/stopping the hydrogen supply from the hydrogen supply device 12 and a regulator 14 for adjusting the hydrogen supply quantity.

The fuel cell system includes an off-gas circulation path 15 for recirculating an off-gas containing unreacted hydrogen, emitted from the fuel cell 1, to the fuel cell 1. The off-gas circulation path 15 is designed to make the off-gas, emitted from the hydrogen exit of the fuel cell 1, flow into the hydrogen supply path 11 on the downstream side of the regulator 14.

In the off-gas circulation path 15, an off-gas pump (pump means) 16 is provided to boost the off-gas for circulating it in the off-gas circulation path 15. In the first embodiment, a motor-driven compressor is employed as the off-gas pump 16 and is designed to boost the off-gas to the extent of the high-pressure hydrogen to be supplied from the hydrogen supply device 12.

Moreover, a gas-liquid separator 17 is provided on the upstream side of the off-gas pump 16 in the off-gas circulation path 15 to act as a moisture removing means for separating and removing the moisture contained in the off-gas. The moisture separated by the gas-liquid separator 17 is discharged by opening a moisture discharge valve 18.

On the downstream side of the off-gas pump 16 in the off-gas circulation path 15, an emission path 19 is provided in a state branched therefrom to emit the off-gas to the external. In the emission path 19, there are provided an off-gas emission valve 20 and an off-gas treating unit 21. Ordinarily, the off-gas emission valve 20 is set in a closed condition to circulate the off-gas through the off-gas circulation path 15 to the fuel cell 1, while the off-gas emission valve 20 is opened to emit the off-gas to the external, for example, if the hydrogen concentration in the off-gas becomes low. At this time, the off-gas is emitted after treated in the off-gas treating unit 21.

On the downstream side of the branching point of the emission path 19 in the off-gas circulation path 15, a check valve 22 is provided in order to prevent the off-gas from flowing reversely.

The fuel cell system according to the first embodiment is equipped with a moisture concentration sensor (moisture concentration detecting means) 23 for detecting a moisture concentration (humidity) of the off-gas, a pressure sensor 24 for detecting a pressure of the off-gas, and an outside air temperature sensor (outside air temperature detecting means) 25 for detecting an outside air temperature in the vicinity of the fuel cell 1. The sensor signals therefrom are inputted to an electronic control unit 26.

Figure 2:
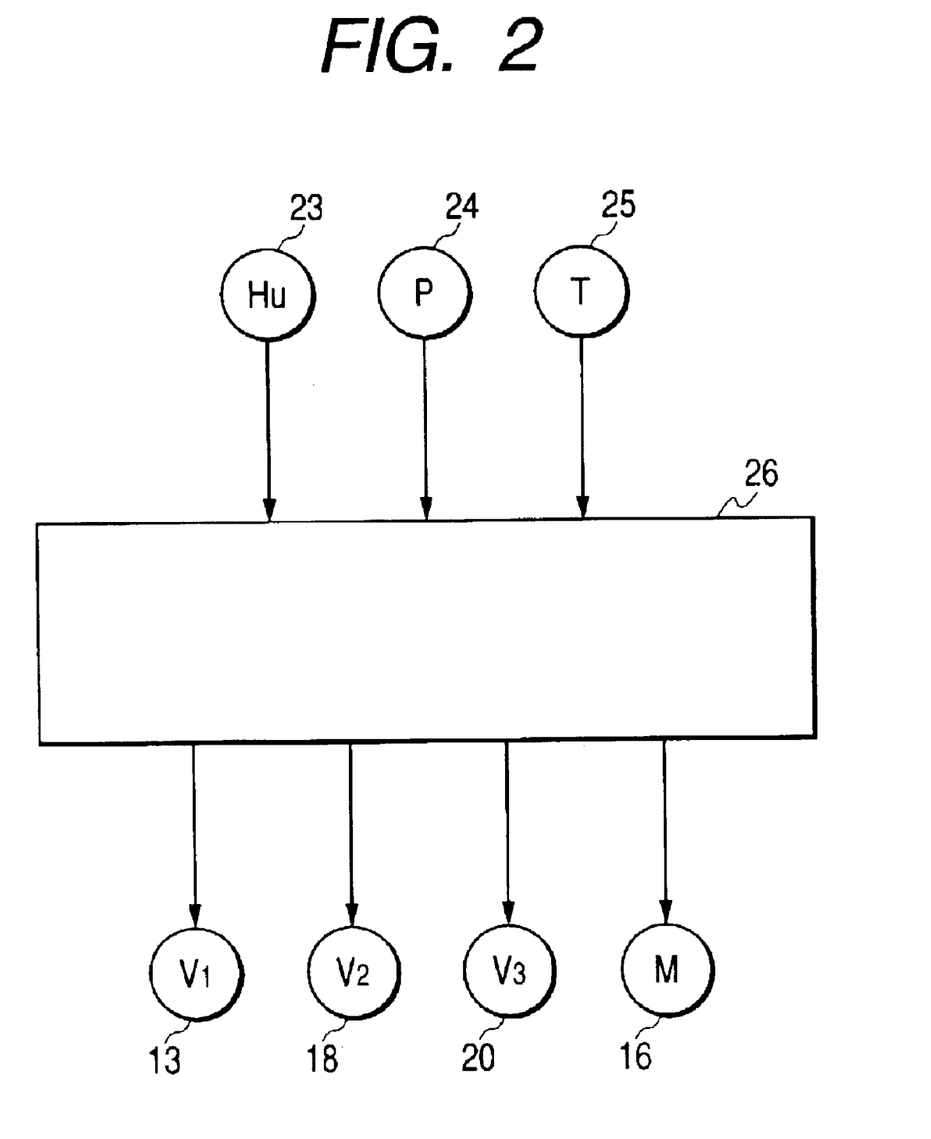
FIG. 2 is a block diagram showing the input/output of an electronic control unit in the first embodiment.

FIG. 2 is an illustration of the input/output of signals to/from the electronic control unit (ECU) 26. As FIG. 2 shows, the electronic control unit 26 receives sensor signals from the moisture concentration sensor 23, the pressure sensor 24 and the outside air temperature sensor 25, and outputs control signals to the hydrogen supply valve 13, the moisture discharge valve 18, the off-gas emission valve 20 and the off-gas pump 16.

The fuel cell 1 generates heat stemming from its power generation. For this reason, the fuel cell system is equipped with a cooling system (not shown) to cool the fuel cell 1 to maintain the operating temperature at an appropriate temperature (approximately 80° C.).

Figure 3:
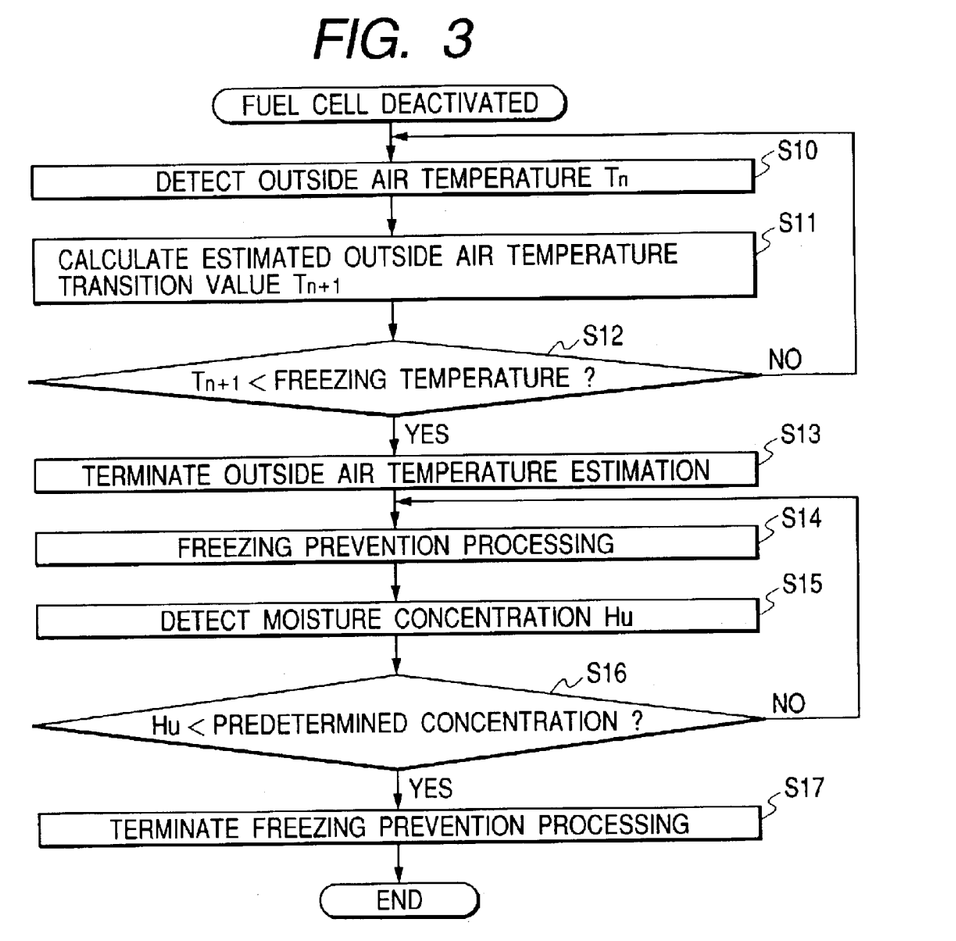
FIG. 3 is a flow chart showing freezing prevention control in the first embodiment.

Referring to FIG. 3, a description will be given hereinbelow of freezing prevention control in the fuel cell system thus constructed. FIG. 3 is a flow chart showing a flow of the freezing prevention control to be executed in the electronic control unit 26.

The freezing prevention control starts in response to the deactivation of the fuel cell 1. At this time, moisture remains in the interior of the fuel cell 1, the piping, and others.

First of all, the outside air temperature sensor 25 detects an outside air temperature $T_n$ (S10). This outside air temperature detection is conducted at a predetermined period (for example, at intervals of several minutes). Then, a calculation of a transition estimated value $T_{n+1}$ of the outside air temperature is carried out (S11).

Figure 4:
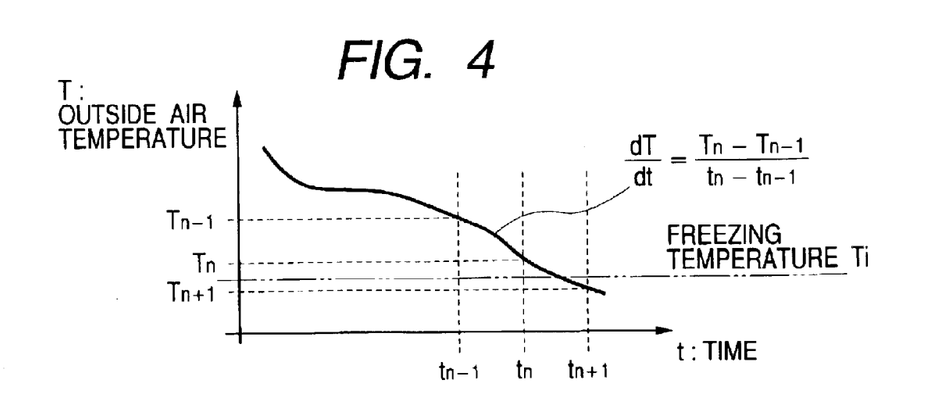
FIG. 4 is a characteristic illustration useful for explaining the estimation of a transition of an outside air temperature.

FIG. 4 is an illustration useful for explaining the estimation of a transition of an outside air temperature. In FIG. 4, $T_{n-1}$ designates an outside air temperature at the time $t_{n-1}$ of the last measurement, $T_n$ denotes an outside air temperature at the present moment $t_n$, and $T_{n+1}$ depicts an outside air temperature at the time $t_{n+1}$ of the next measurement. Of these values, $T_{n-1}$ and $T_n$ are values measured actually and $T_{n+1}$ is a value estimated.

As FIG. 4 shows, the outside air temperature, varying with the passage of time, is considered to undergo a transition at a constant rate of change (gradient). Therefore, the outside air temperature $T_{n+1}$ at the time $t_{n+1}$ of the next measurement can be estimation-calculated by obtaining an outside air temperature variation (gradient) from the last measurement time $t_{n-1}$ to the present moment $t_n$.

The outside air temperature variation (gradient) from the last measurement time $t_{n-1}$ to the present moment $t_n$ can be obtained through time differentiation as expressed by the following equation (1).

$$dT/dt=(T_n-T_{n-1})/(t_n-t_{n-1}) \quad (1)$$

The outside air temperature $T_{n+1}$ at the next measurement time $t_{n+1}$ can be obtained by adding an outside air temperature variation estimation quantity $((T_n-T_{n-1})/(t_n-t_{n-1}))\,dt$ to the present outside air temperature $T_n$ as expressed by the following equation (2).

$$T_{n+1}=T_n+((T_n-T_{n-1})/(t_n-t_{n-1}))dt \quad (2)$$

Following this, a decision is made as to whether or not the estimated outside air temperature $T_{n+1}$ falls below a freezing temperature Ti' (S12). In this case, since a freezing temperature Ti varies with pressure, the freezing temperature Ti is corrected on the basis of a pressure P of the off-gas detected by the pressure sensor 24 to obtain a corrected freezing temperature Ti' as expressed by the following equation (3), where k signifies a correction coefficient.

$$Ti'=Ti+Ti\times P\times k \quad (3)$$

If the decision result in the step S12 indicates that the estimated outside air temperature $T_{n+1}$ equals or exceeds the freezing temperature Ti', the measurement of the outside air temperature is repeatedly made until the estimated outside air temperature $T_{n+1}$ falls below the freezing temperature Ti'. On the other hand, if the decision result in the step S12 indicates that the estimated outside air temperature $T_{n+1}$ falls below the freezing temperature Ti', the outside air temperature estimation decision is terminated (S13), then followed by the freezing prevention processing (S14).

Concretely, the off-gas pump 16 comes into operation to circulate the off-gas in the order of the off-gas circulation path 15→ the hydrogen supply path 11→ the hydrogen electrode of the fuel cell 1. The off-gas pump 16 is driven by electric power from a secondary battery (not shown). The moisture contained in the off-gas is recovered by the gas-liquid separator 17, thereby gradually reducing the moisture in the off-gas. This can remove the moisture in the interiors of the fuel cell 1, the piping 11, 15 and the off-gas pump 16.

At this time, since the vapor partial pressure becomes low under low-temperature environments, the moisture separation from the off-gas is effectively achievable through the use of the gas-liquid separator 17.

Subsequently, the moisture concentration sensor 23 detects a moisture concentration Hu of the off-gas (S15), and a decision is made as to whether the moisture concentration Hu falls below a predetermined concentration (S16). A concentration below the predetermined concentration signifies that the freezing does not occur. The predetermined concentration can arbitrarily be set for each system. If the decision result in the step S16 indicates that the moisture concentration Hu equals or exceeds the predetermined concentration, the aforesaid freezing prevention processing continuously takes place. On the other hand, if the decision result in the step S16 indicates that the moisture concentration Hu falls below the predetermined concentration, the off-gas pump 16 is deactivated and the freezing prevention processing comes to an end (S17).

With the above-described construction, since the transition of the outside air temperature is estimated so that, if the freezing is expectable, as the freezing prevention processing, the moisture is removed from the interiors of the fuel cell 1, the pippins 11, 15 and the off-gas pump 16, the moisture is removable before the freezing of the moisture. This prevents the activation of the fuel cell 1 from becoming difficult due to the moisture freezing at the next activation of the fuel cell 1.

In addition, in the first embodiment, since the transition of the outside air temperature is estimated so that the freezing prevention processing is conducted only if the freezing is expectable, the useless consumption of power is preventable in conducting the freezing prevention processing. Still additionally, if the freezing is not expectable, because of no execution of the moisture removal, the electrolyte membrane of the fuel cell 1 is kept in a damp and wet condition, which eliminates the need for placing the electrolyte membrane into a damp and wet condition at the next activation.

The aforesaid step S11 corresponds to the outside air temperature estimating means in the present invention, the aforesaid step S12 corresponds to the freezing decision means in the invention, and the aforesaid step S14 corresponds to the freezing prevention processing means in the invention.

(Second Embodiment)

Secondly, referring to FIG. 5, a description will be given hereinbelow of a second embodiment of the present invention. The parts corresponding to those in the above-described first embodiment are marked with the same reference numerals, and the description thereof will be omitted for brevity. The second embodiment will be described about only differences therefrom.

Figure 5:
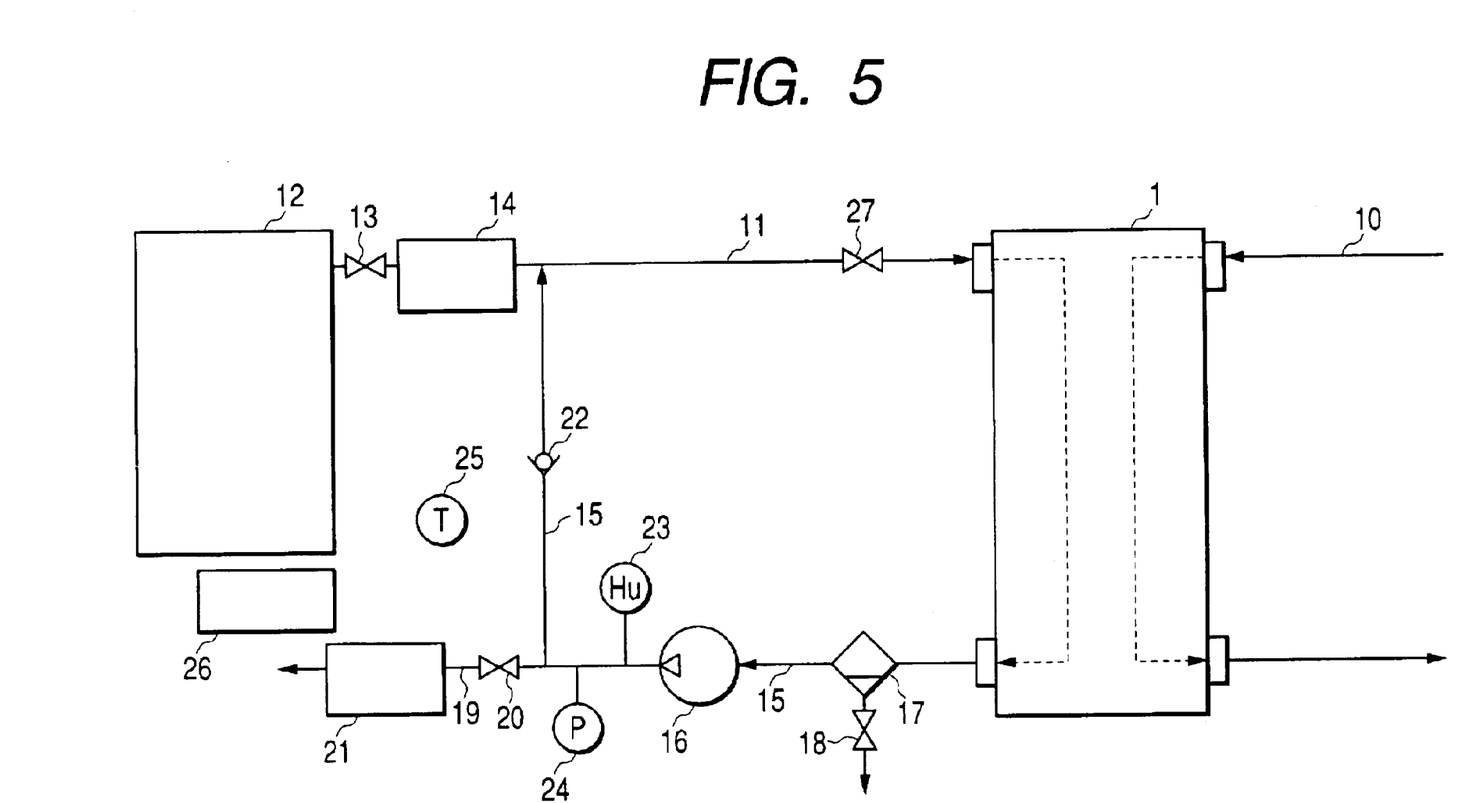
FIG. 5 is a conceptual illustration of the entire construction of a fuel cell system according to a second embodiment of the present invention.

FIG. 5 is an illustration of the entire construction of a fuel cell system according to the second embodiment. As FIG. 5 shows, in the second embodiment, a decompression valve 27 is provided on the upstream side of a fuel cell 1 in a hydrogen supply path 11 in order to open/close a flow passage.

In this construction, in conducting the freezing prevention processing in the aforesaid step S14, the decompression valve 27 is closed and an off-gas emission valve 20 is opened and an off-gas pump 16 is further activated, thereby accomplishing the decompression between the decompression valve 27 and the off-gas pump 16. Accordingly, the moisture in the interior of the fuel cell 1 and in the interior of the off-gas pump 16 are decompression-boiled to be discharged to the external, which enables the moisture in the interior of the fuel cell 1 and in the interior of the off-gas pump 16 to be removed effectively.

(Third Embodiment)

Furthermore, referring to FIG. 6, a description will be given hereinbelow of a third embodiment of the present invention. The parts corresponding to those in the above-described first embodiment are marked with the same reference numerals, and the description thereof will be omitted for brevity. The third embodiment will be described about only differences therefrom.

Figure 6A:
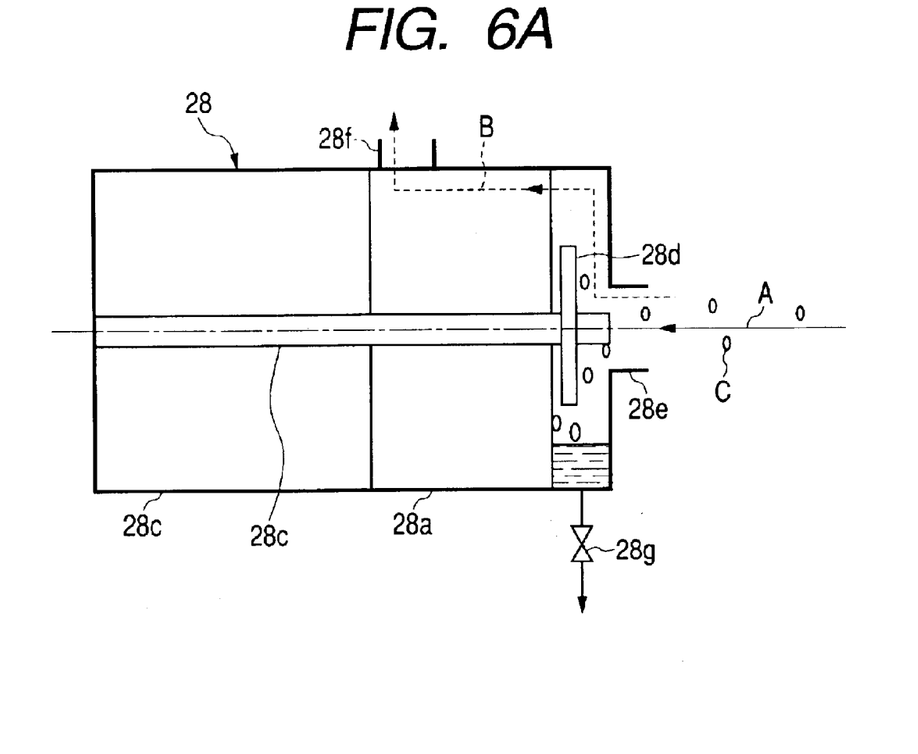
FIG. 6A is a cross-sectional view showing an off-gas pump according to a third embodiment of the present invention.
Figure 6B:
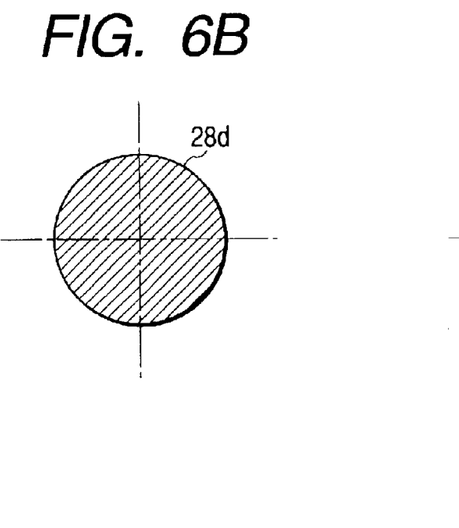
FIGS. 6B and 6C are plan views showing a rotary plate in the third embodiment.
Figure 6C:
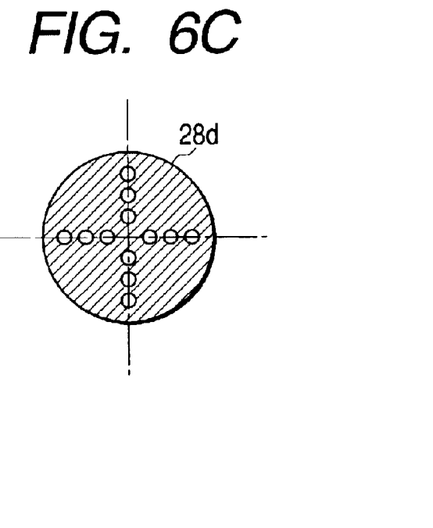

FIGS. 6A, 6B and 6C are illustrations of a construction of an off-gas pump 28 (28a) according to the third embodiment. Of these drawings, FIG. 6A is a cross-sectional view showing the off-gas pump 28 and FIGS. 6B and 6C are plan views showing a rotary plate.

As FIG. 6A shows, the off-gas pump 28 according to the third embodiment is integrated with a cyclone type gas-liquid separator. A gas-liquid separation rotary plate 28d is mounted over a drive shaft 28c of a motor 28b for a rotary pump 28a. An off-gas intake opening 28e is made above the drive shaft 28c in its an axial direction.

The rotary plate 28d can be formed into a flat configuration shown in FIG. 6B or formed into a hole-made configuration shown in FIG. 6C. In the case of the flat configuration shown in FIG. 6B, although the pressure loss is large at the off-gas collision, the gas-liquid separation effect is great. In the case of the hole-made configuration shown in FIG. 6C, although the pressure loss is small at the off-gas collision, the gas-liquid separation effect is low.

An off-gas A containing a gas component B and a liquid droplet/vapor component C is led through the intake opening 28e by the pumping effect to collide against the rotary plate 28d. At this time, the gas component B having a small inertia force is sucked into the interior of the pump 28a and then discharged through a moisture discharge valve 28f. On the other hand, the liquid droplet/vapor component B having a large inertia force collides against the rotary plate 28d and is separated/trapped by a centrifugal force in pump wall directions. The separated moisture drops downwardly and remains, and is discharged by opening the moisture discharge valve 28f.

In this way, the employment of the cyclone type gas-liquid separator equipped with the rotary plate 28d driven by the motor 28b allows the moisture to be effectively removed from the off-gas. Moreover, since the off-gas pump 28 is integrated with the gas-liquid separator, there is no need to install the gas-liquid separator independently, which enables the size reduction of the fuel cell system.

(Other Embodiment)

In the above-described embodiments, although the corrected value Ti' of a freezing temperature is calculated on the basis of the off-gas pressure P, the present invention is not limited to this, but it is also appropriate that the relationship between a pressure P and a corrected value Ti' of a freezing temperature is set previously in the form of a map and the corrected freezing temperature value Ti' is derived from the map on the basis of the pressure P.

In addition, in the above-described embodiments, although the moisture removal is done by the gas-liquid separator 17 serving as the freezing prevention processing means, the present invention is not limited to this, but it is also appropriate to use a moisture absorption device which absorbs and removes the moisture through the use of, for example, an absorbent (silica gel, active carbon, or the like). Alternatively, it is also acceptable that, for example, a dry gas (for example, dry air, dry hydrogen) is supplied to the fuel cell 1 to remove the moisture.

Still additionally, it is also appropriate that the moisture separated and recovered by the gas-liquid separator 17 is used as cooling water for the fuel cell system or as humidification water.

It should be understood that the present invention is not limited to the above-described embodiments, and that it is intended to cover all changes and modifications of the embodiments of the invention herein which do not constitute departures from the spirit and scope of the invention.

What is claimed is:

1. A fuel cell system including a fuel cell which generates electric energy through chemical reaction between hydrogen and oxygen, comprising:

an off-gas circulation path for recirculating an off-gas, including unreacted hydrogen, emitted from said fuel cell, to said fuel cell;

outside air temperature detecting means for detecting an outside air temperature in the vicinity of said fuel cell;

outside air temperature estimating means for, after said fuel cell enters a deactivated state, estimating a transition of outside air temperature on the basis of a variation of said outside air temperature detected by said outside air temperature detecting means;

freezing decision means for making a decision as to whether or not the estimated outside air temperature obtained by said outside air temperature estimating means falls below a predetermined freezing temperature at which moisture freezes; and freezing prevention processing means for, when said freezing decision means makes a decision that the estimated outside air temperature falls below said predetermined freezing temperature, removing moisture contained in the off-gas for preventing the moisture from freezing in the interior of said fuel cell.

2. The system according to claim 1, wherein said outside air temperature estimating means time-differentiates the outside air temperature variation for calculating and estimating the outside air temperature transition.

3. The system according to claim 1, wherein, when a decision is made that the estimated outside air temperature falls below said predetermined freezing temperature, the outside air temperature estimation in said outside air temperature estimating means is terminated.

4. The system according to claim 1, further comprising:

an off-gas circulation path for recirculating an off-gas including unreacted hydrogen, emitted from said fuel cell, to said fuel cell; and pump means provided in said off-gas circulation path for supplying a gas within said off-gas circulation path under pressure, said freezing prevention processing means preventing moisture from freezing in the interior of said off-gas circulation path and in the interior of said pump means.

5. The system according to claim 4, further comprising a gas-liquid separator provided in said off-gas circulation path for separating and removing moisture contained in a gas passing through said off-gas circulation path, said freezing prevention processing means activating said pump means when a decision is made that the estimated outside air temperature falls below said predetermined freezing temperature.

6. The system according to claim 4, further comprising a pressure sensor for detecting a pressure in said off-gas circulation path so that said predetermined freezing temperature is corrected on the basis of the pressure in said off-gas circulation path detected by said pressure sensor.

7. The system according to claim 1, further comprising moisture concentration detecting means for detecting a moisture concentration of said off-gas so that said freezing prevention processing means is terminated when the moisture concentration of said off-gas detected by said moisture concentration detecting means becomes below a predetermined value.

8. The system according to claim 4, further comprising:

a decompression valve provided in a hydrogen supply path for supplying hydrogen to said fuel cell and made to open and close said hydrogen supply path; and an emission path provided on the downstream side of said pump means in said off-gas circulation path for emitting a gas discharged from said pump means to the external, said freezing prevention processing means making said decompression valve close said hydrogen supply path and making said pump means discharge a gas within said off-gas circulation path through said emission path to the external.

9. The system according to claim 5, wherein said gas-liquid separator is of a centrifugal type which is rotationally driven by a drive shaft of said pump means.

\* \* \* \* \*